(12) United States Patent
Miyamoto (10) Patent No.: US 6,224,046 B1
(45) Date of Patent: May 1, 2001

(54) FLUID-FILLED BUSHING

(75) Inventor: Yasuo Miyamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/225,487

(22) Filed: Jan. 6, 1999

(30) Foreign Application Priority Data

Jan. 14, 1998 (JP) .................................................. 10-005594

(51) Int. Cl.$^7$ .................................................. B60G 11/22
(52) U.S. Cl. .................................. 267/281; 280/124.108; 280/124.148; 267/140.12; 267/141.3
(58) Field of Search .............................. 267/140.12, 141.3, 267/279, 280, 281, 292, 293; 280/124.108, 124.109, 124.146, 124.148

(56) References Cited

U.S. PATENT DOCUMENTS

| | | | |
|---|---|---|---|
| 3,508,745 | * | 4/1970 | Deane ................................... 267/281 |
| 3,572,677 | * | 3/1971 | Damon ................................. 267/281 |
| 3,642,268 | * | 2/1972 | Hipsher ................................ 267/281 |
| 4,513,990 | * | 4/1985 | Morita et al. ...................... 267/281 |
| 4,634,108 | * | 1/1987 | Munch ................................. 267/279 |
| 4,693,491 | * | 9/1987 | Akatsu et al. ...................... 188/378 |
| 4,834,351 | * | 5/1989 | Freudenberg et al. ............ 267/279 |
| 5,058,867 | * | 10/1991 | Hadano et al. ................... 267/141.3 |
| 5,060,918 | * | 10/1991 | Kanda .............................. 267/140.12 |
| 5,087,021 | * | 2/1992 | Tanahashi et al. .............. 267/140.12 |
| 5,158,271 | * | 10/1992 | Hein ..................................... 267/281 |
| 5,190,269 | * | 3/1993 | Ikeda et al. ......................... 267/293 |
| 5,657,510 | * | 8/1997 | Satori et al. ..................... 267/140.11 |
| 5,692,767 | * | 12/1997 | Kato ..................................... 267/293 |
| 5,947,454 | * | 9/1999 | Miyamoto ........................ 267/140.12 |
| 5,975,509 | * | 11/1999 | Miyamoto ........................ 267/140.12 |

* cited by examiner

Primary Examiner—Christopher P. Schwartz
(74) Attorney, Agent, or Firm—Sughrue, Mion, Zinn, Macpeak & Seas, PLLC (57) ABSTRACT

A fluid-filled bushing for supporting on a vehicle body an end portion of a suspension arm. The bushing is designed such that the frequency to keep the dynamic spring constant of the fluid-filled bushing to a minimum, or the frequency to keep the loss coefficient of the same to a maximum is set in the vicinity of the rigid resonance frequency $f_o$ (for example, 600 Hz) of the suspension arm. As a result, a transmission force (transmission force N=resonance magnification υxdynamic spring constant K*) due to the vibration in the vicinity of the above-mentioned rigid resonance frequency transmitted from the road surface through the suspension arm is reduced, so that it is possible to improve road noise.

6 Claims, 13 Drawing Sheets

FLUID-FILLED BUSHING

BACKGROUND OF THE INVENTION

The present invention relates to a fluid-filled bushing for supporting an end portion of a suspension arm on a vehicle body, the suspension arm suspending a wheel of a motor vehicle.

Figure 9:
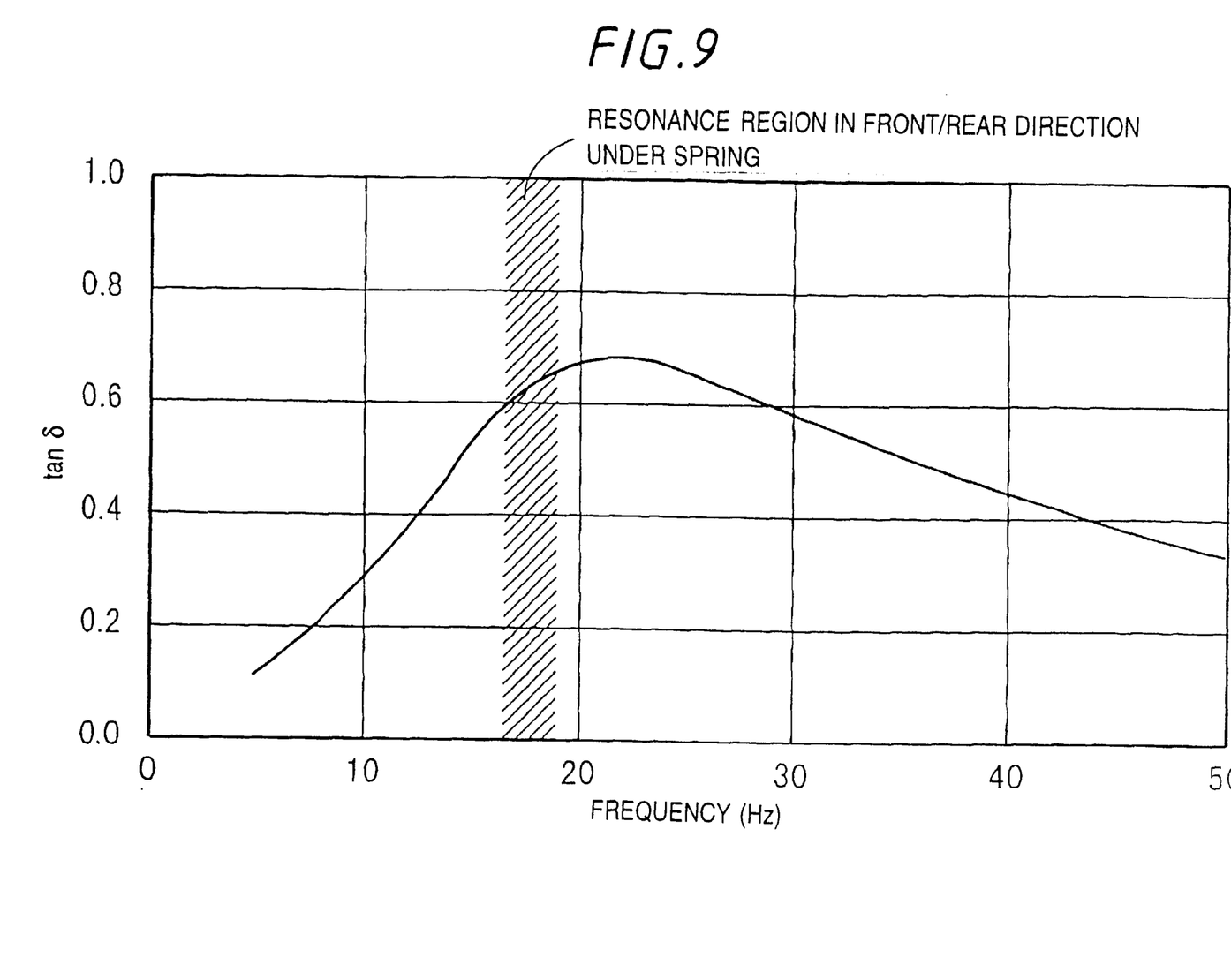
FIG. 9 is a graph showing the characteristic of a loss coefficient of a conventional bushing.
Figure 10:
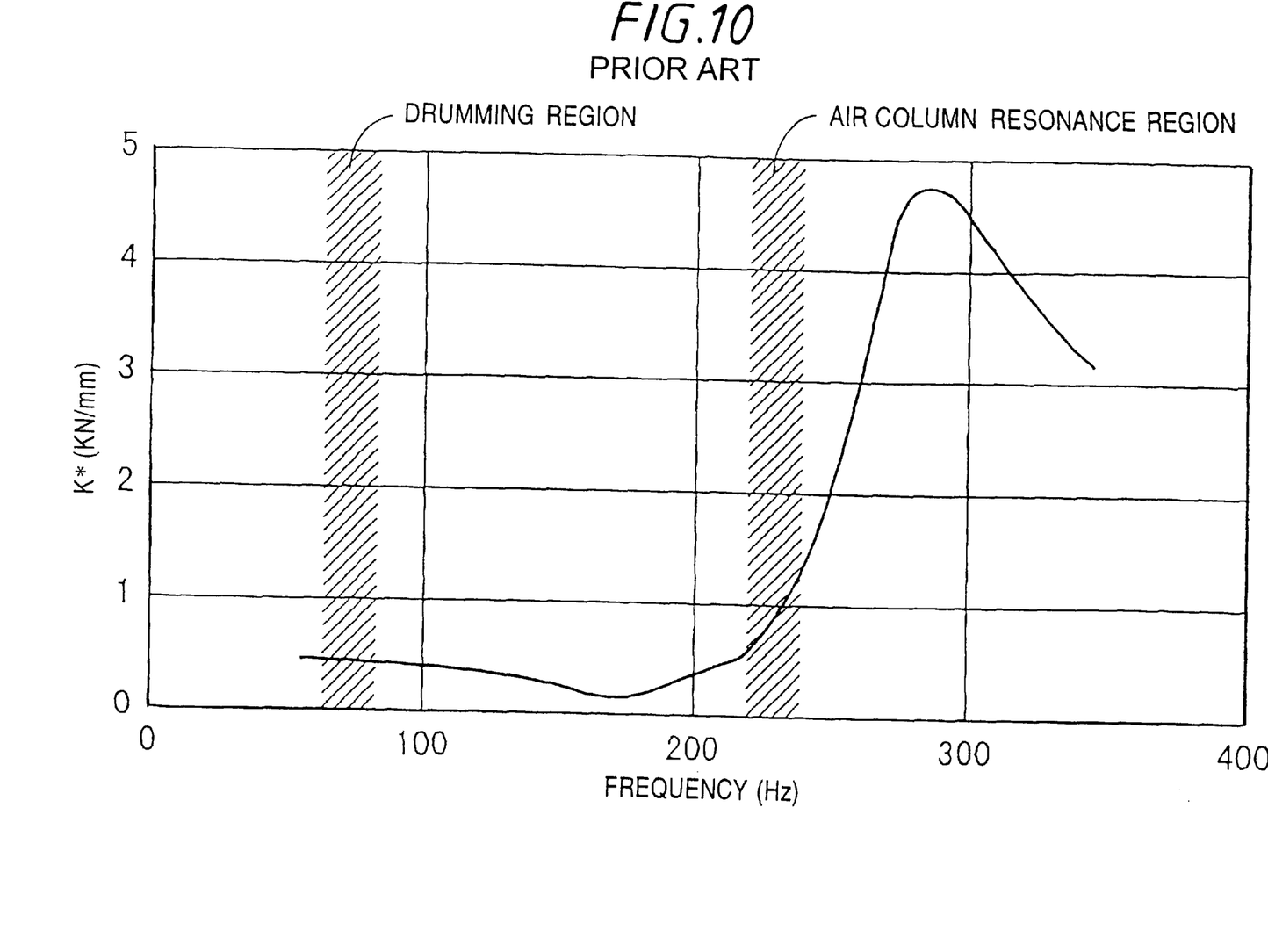
FIG. 10 is a graph showing the characteristic of a dynamic spring constant of a conventional bushing.

The characteristics of a conventional fluid-filled bushing for supporting a suspension arm of a motor vehicle are tuned up for the following purposes:

(1) to reduce longitudinal resonance below a spring of a suspension caused by increase of damping force (that is, loss coefficient tan δ) in the vicinity of 18 Hz as an input frequency (see FIG. 9);

(2) to reduce air-columnar resonance sound of a tire caused by reduction of a dynamic spring constant $K^*$ in the vicinity of 230 Hz as an input frequency (see FIG. 10); and (3) to reduce cavity resonance sound (drumming) peculiar to a cabin due to reduction of the dynamic spring constant $K^*$ in the vicinity of 80 Hz as an input frequency (see FIG. 10). As a result, comfortableness to drive or road noise is improved in the input frequency ranged up to the vicinity of 230 Hz.

However, in the above-mentioned conventional bushing, it was impossible to sufficiently improve road noise in a high-frequency range of not less than 500 Hz which is a rigid resonance frequency range of a suspension arm. There was a problem that rustling noise is transmitted from the road surface.

Figure 11:
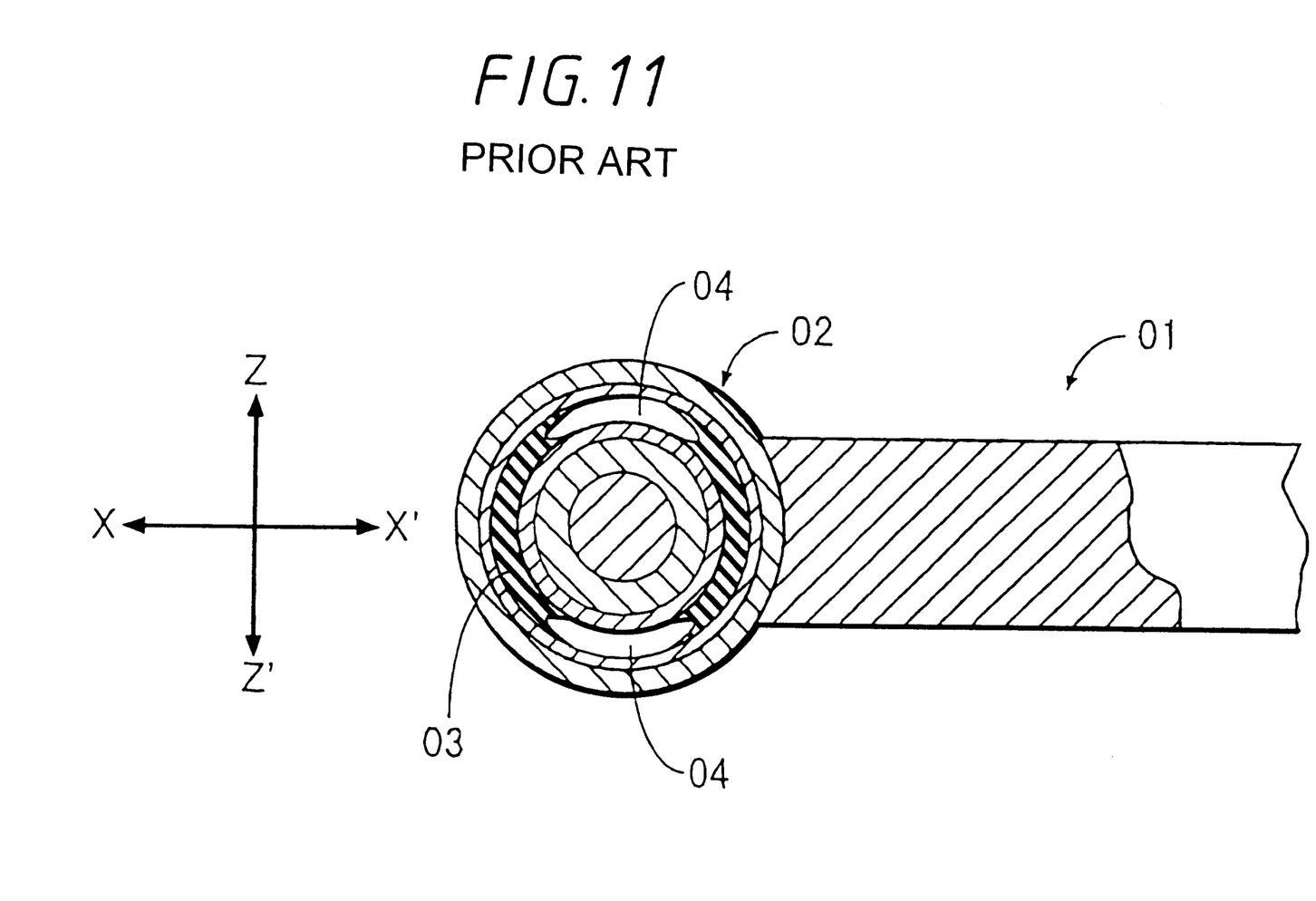
FIG. 11 is a diagram showing a structure of a conventional anisotropic bushing.
Figure 12:
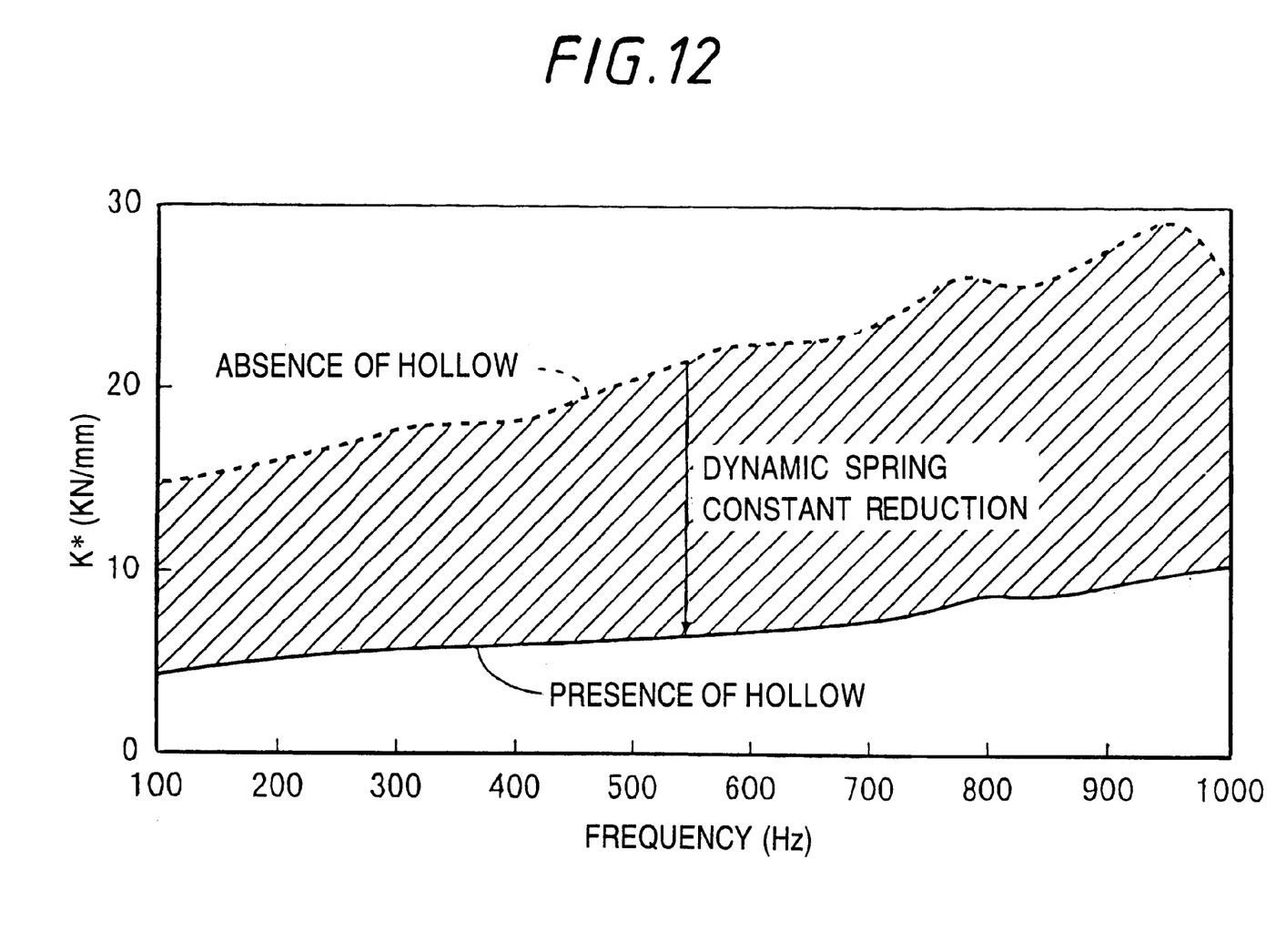
FIG. 12 is a diagram showing a change in characteristic of a dynamic spring constant based on the presence/absence of a hollow in a bushing.

To improve road noise in the above-mentioned high-frequency range, the present applicant made up an anisotropic bushing in which a hollow (space) was formed inside a bushing rubber of a solid bushing having no fluid chamber, and tested a real vehicle mounted with the anisotropic bushing for road noise. FIG. 11 shows the anisotropic bushing. In a bushing 02 disposed in an end portion of a suspension arm 01 to be attached to a vehicle body, a pair of upper and lower hollows 04 and 04 are formed in a bushing rubber 03 of the bushing 02. By means of the hollows 04 and 04 formed in the bushing rubber 03 in the above manner, a dynamic spring constant $K^*$ in the up/down direction (Z–Z' direction) having a large connection with road noise can be reduced to about ⅓ in a broad frequency range, while a static spring constant in the vehicle left/right direction (X–X' direction) having a large connection with steering stability performance of the vehicle is ensured sufficiently (see FIG. 12).

Although the reduction of road noise was expected in a high frequency range by the reduction of the above-mentioned dynamic spring constant $K^*$, the test of the real vehicle mounted with the bushing resulted in, far from reducing, increasing road noise in the high frequency range. It therefore became clear that road noise in a high frequency range could not be improved only by reducing a dynamic spring constant $K^*$ of a bushing. The reason will be described below.

Figure 13:
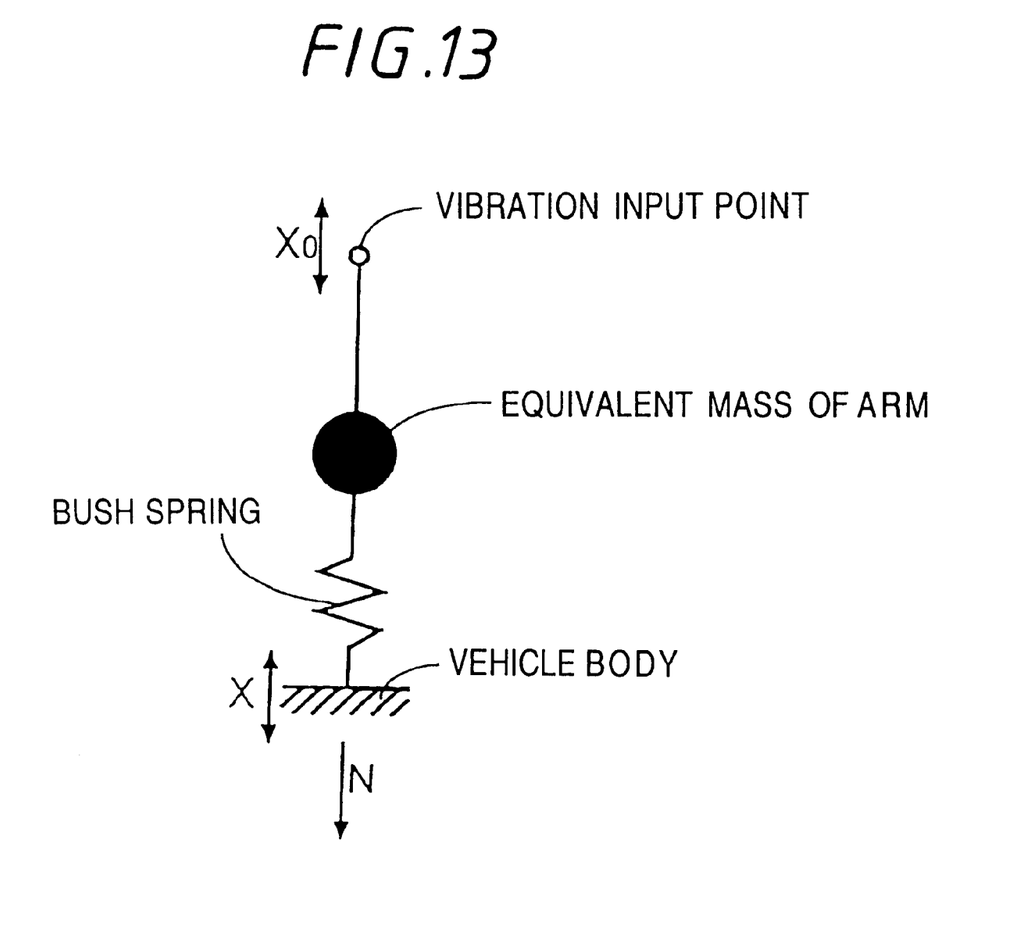
FIG. 13 is a diagram showing a model of suspension.

FIG. 13 shows a model of suspension of a motor vehicle, in which an equivalent mass of a suspension arm and a spring of a bushing are connected in series between a vehicle body and a vibration input point (a connection portion with a knuckle). A transmission force N which is a parameter expressing the size of road noise is defined as a maximum value of a force transmitted from the suspension arm to the vehicle body. A resonance magnification υ is defined as (maximum value of output amplitude x)/(input amplitude $x_0$). Further, the above-mentioned rigid resonance frequency $f_0$ is defined as a frequency with which the suspension arm resonates. The transmission force N is given by the resonance magnification U and the dynamic spring constant $K^*$ in the following relation:

transmission force N=resonance magnification υ×dynamic spring constant $K^*$

As is apparent from the above expression, if only the dynamic spring constant $K^*$ is reduced, the transmission force N is not always reduced when the resonance magnification υ is large. It is therefore impossible to improve high-frequency road noise in a range of the rigid resonance frequency $f_0$.

SUMMARY OF THE INVENTION

The present invention was made taking the foregoing situation into consideration, and it is an object thereof to provide a fluid-filled bushing which can improve high-frequency road noise transmitted from a road surface through a suspension arm.

The foregoing object can be attained by a fluid-filled bushing, according to the present invention, for supporting an end portion of a suspension arm on a vehicle body, the suspension arm suspending a wheel of a motor vehicle, wherein a frequency to keep a dynamic spring constant of the fluid-filled bushing to a minimum is set in the vicinity of a rigid resonance frequency of the suspension arm.

Further, the foregoing object can also be attained by a a fluid-filled bushing, according to the present invention, for supporting an end portion of a suspension arm on a vehicle body, the suspension arm suspending a wheel of a motor vehicle, characterized in that a frequency to keep a loss coefficient of the fluid-filled bushing to a maximum is set in the vicinity of a rigid resonance frequency of the suspension arm.

In the above-mentioned configuration of the bushing according to the present invention, the frequency to keep the dynamic spring constant of the fluid-filled bushing to a minimum, or the frequency to keep the loss coefficient of the same to a maximum is set in the vicinity of the rigid resonance frequency of the suspension arm. Accordingly, a transmission force (resonance magnification υ×dynamic spring constant $K^*$) due to the vibration in the vicinity of the above-mentioned rigid resonance frequency transmitted from the road surface through the suspension arm is reduced, so that it is possible to improve road noise.

Note that the rigid resonance frequency designates a frequency with which the suspension arm resonates. In addition, the vicinity of the rigid resonance frequency designates a range of 0.7 $f_0$ to 1.5 $f_0$ when the rigid resonance frequency is expressed by $f_0$.

DETAILED DESCRIPTION OF THE PREFERRED EMBODIMENTS

A mode for carrying out the present invention will be described below on the basis of a preferred embodiment of the present invention shown in the accompanying drawings.

Figure 1:
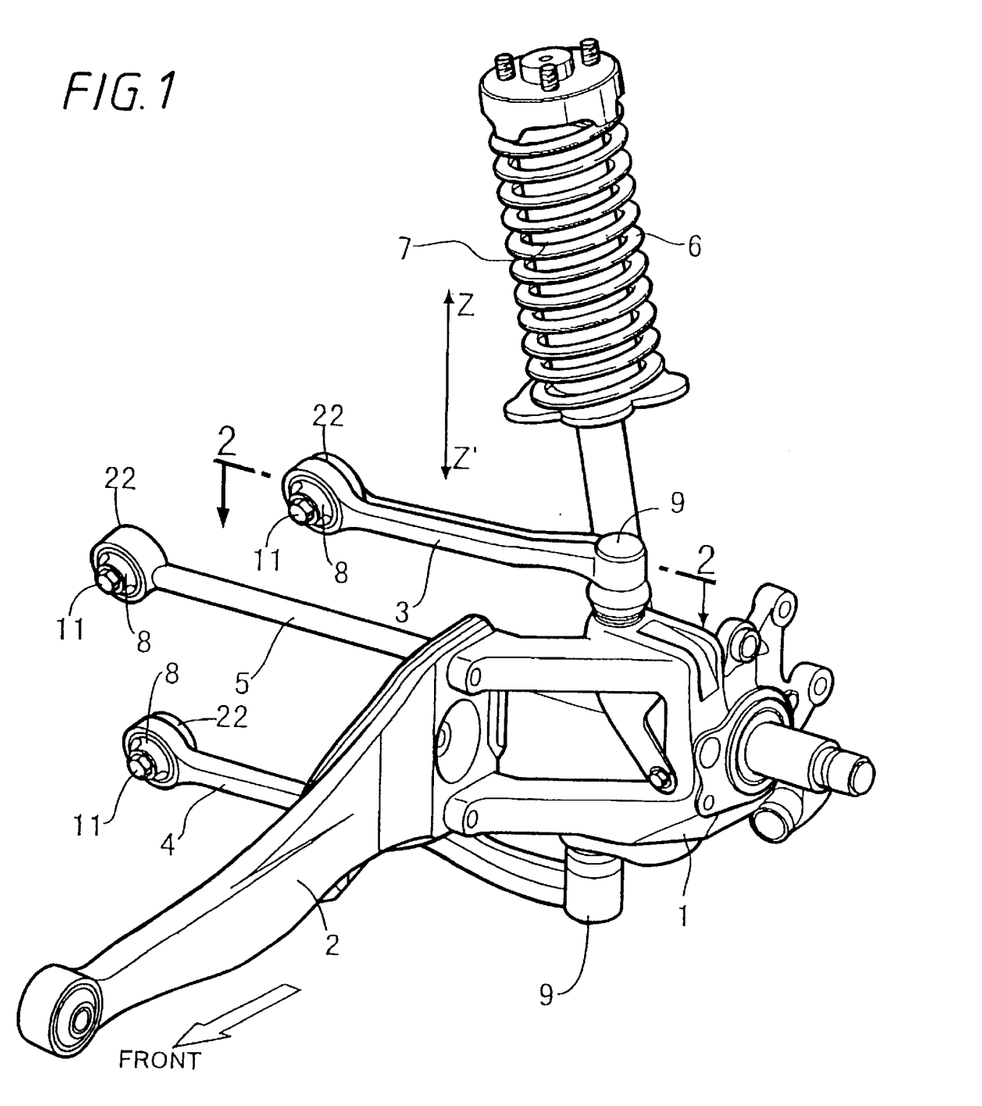
FIG. 1 is a perspective view of a rear suspension using a fluid-filled bushing.
Figure 2:
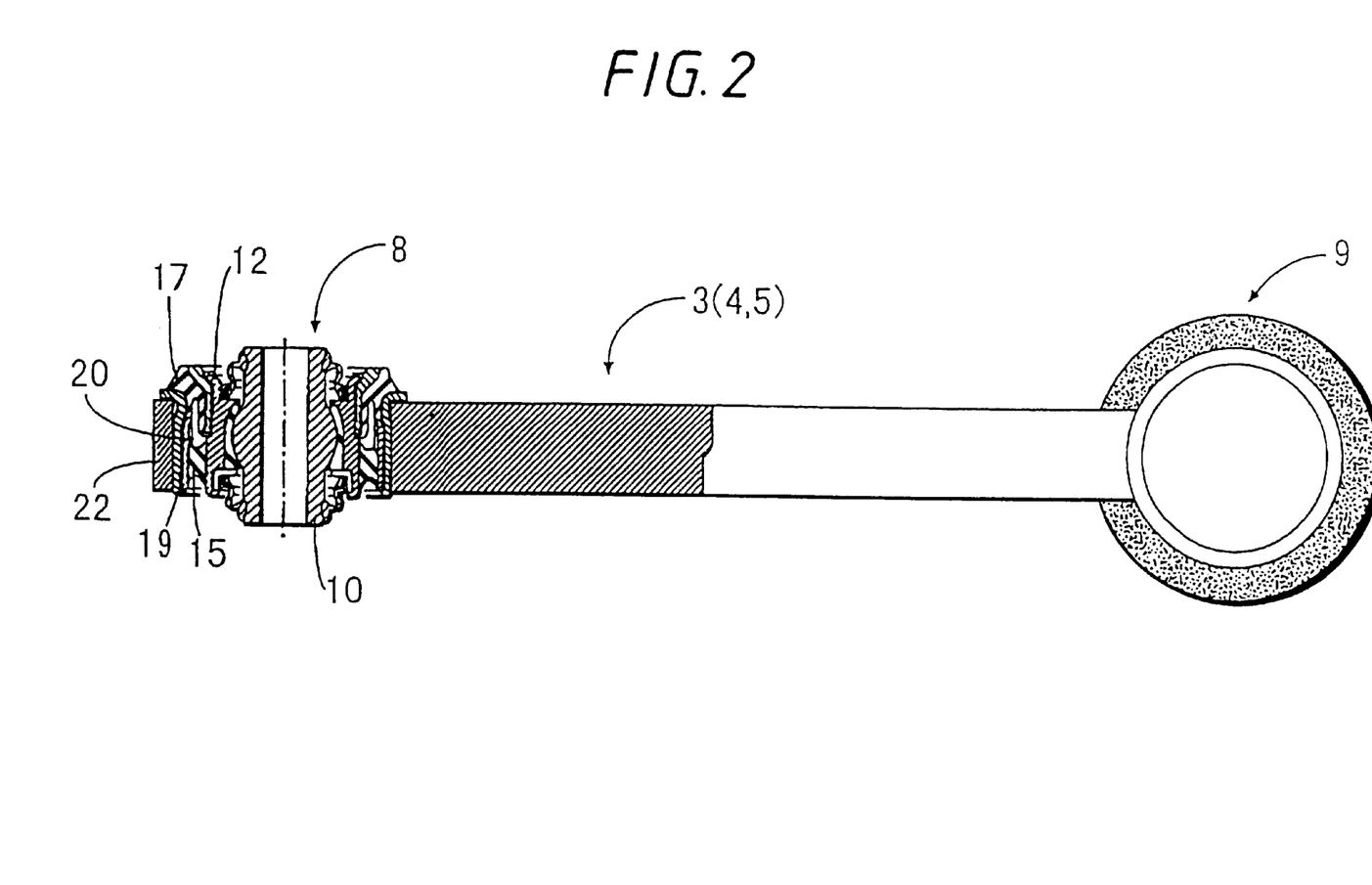
FIG. 2 is an expanded sectional view taken on line II—II in FIG. 1.
Figure 3:
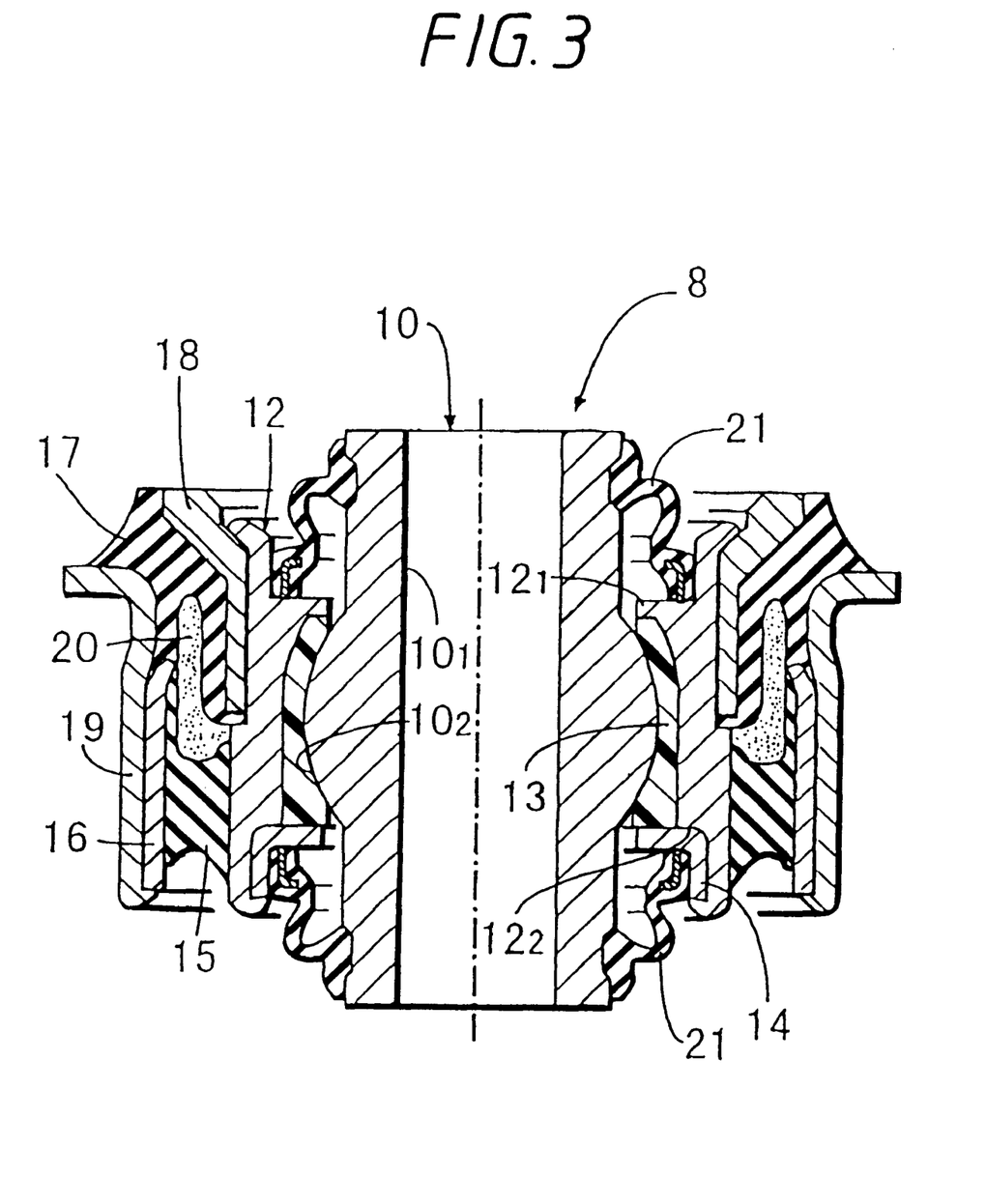
FIG. 3 is a main part expanded view of FIG. 2.
Figure 4:
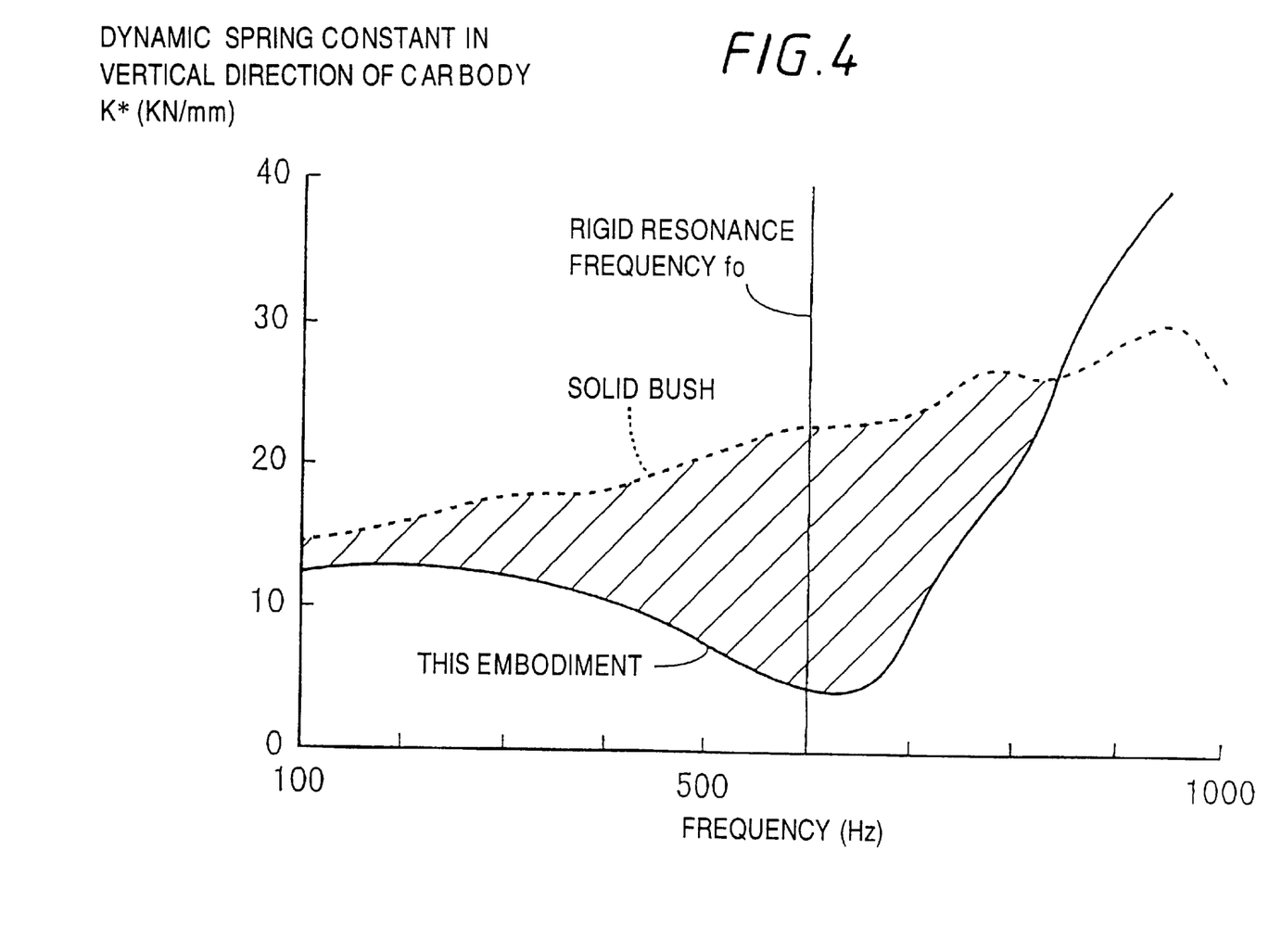
FIG. 4 is a graph showing the relation between an input frequency and a dynamic spring constant.
Figure 5:
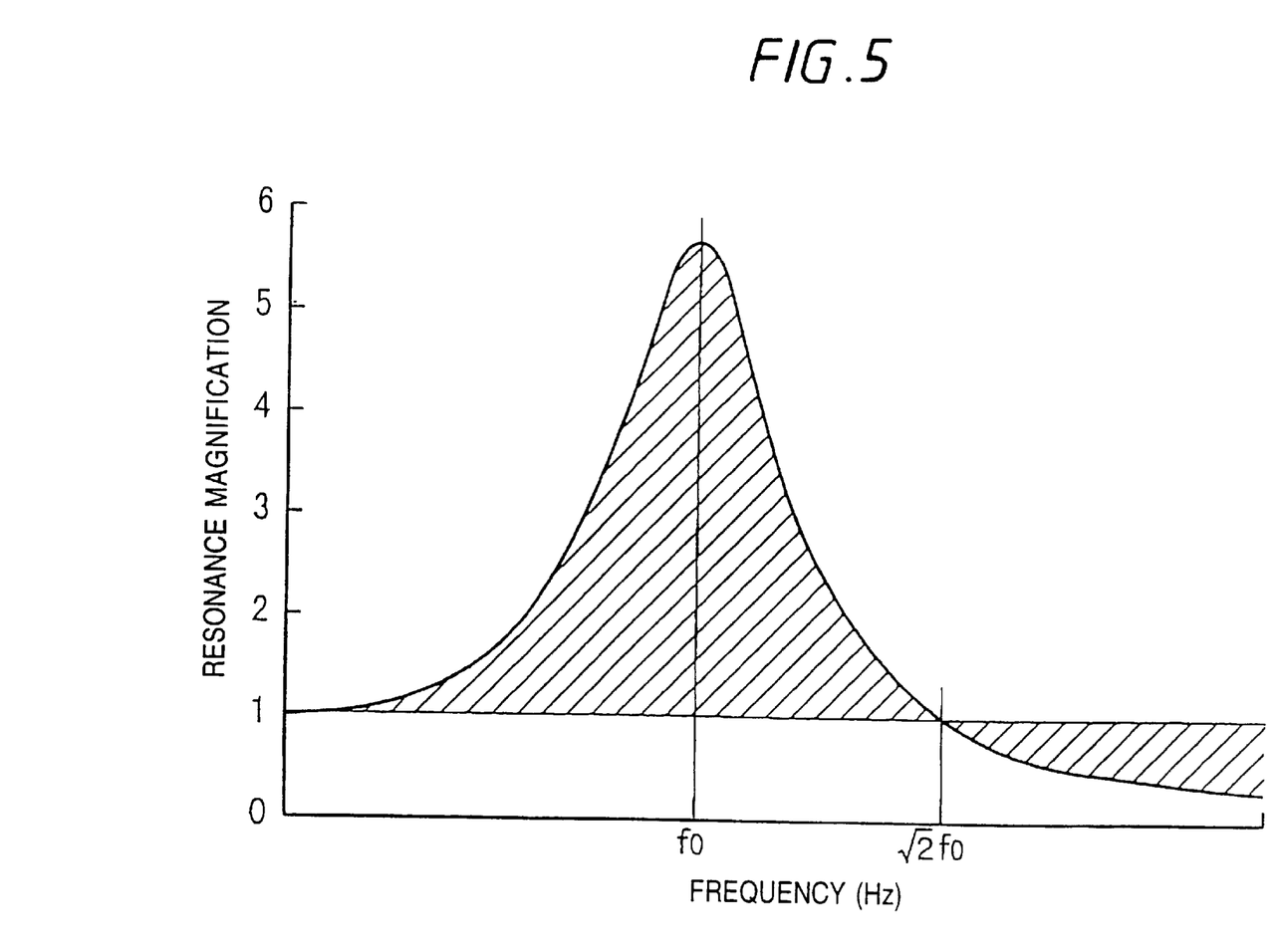
FIG. 5 is a graph showing the relation between an input frequency and a resonance magnification.
Figure 6:
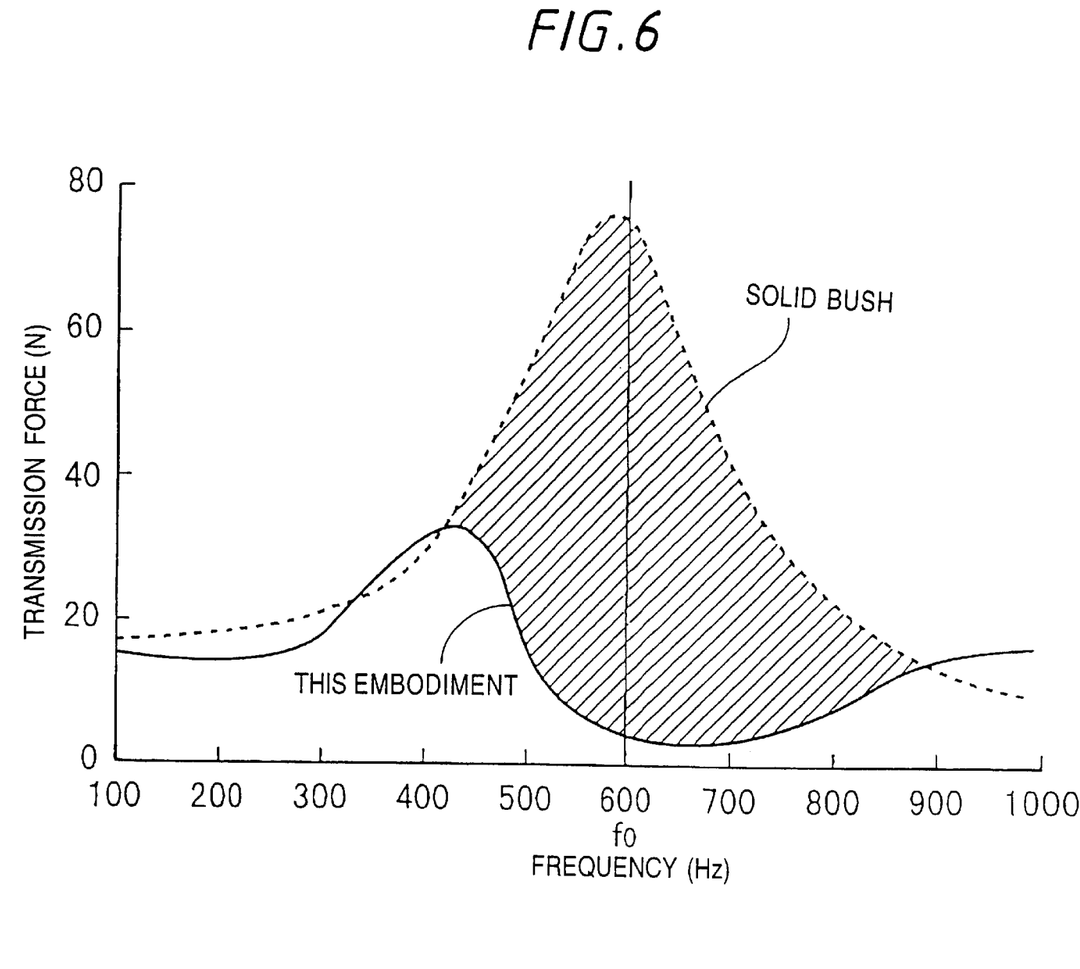
FIG. 6 is a graph showing a relation between an input frequency and a transmission force.
Figure 7:
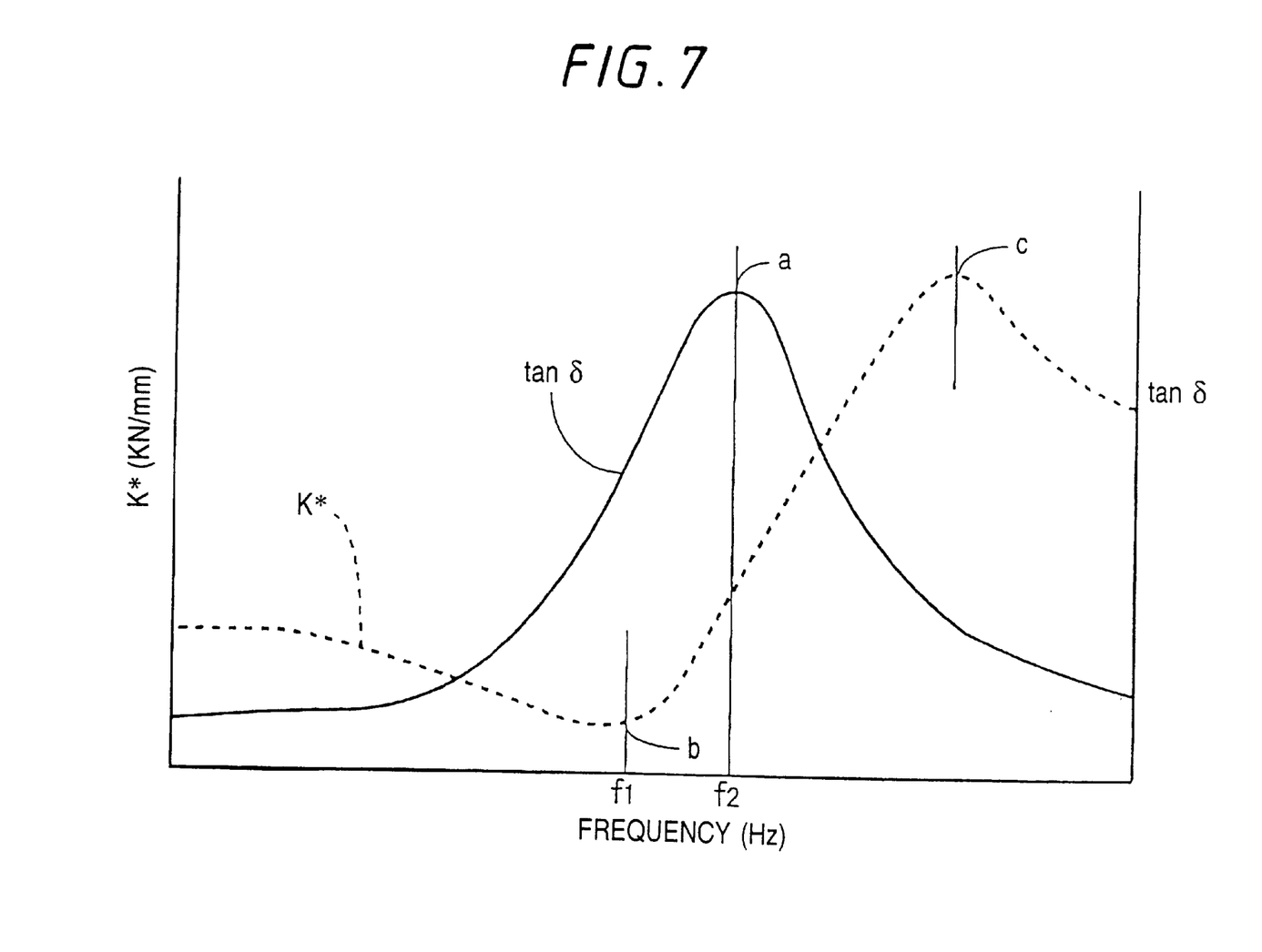
FIG. 7 is a graph comparing the characteristics of a dynamic spring constant and a loss coefficient.
Figure 8:
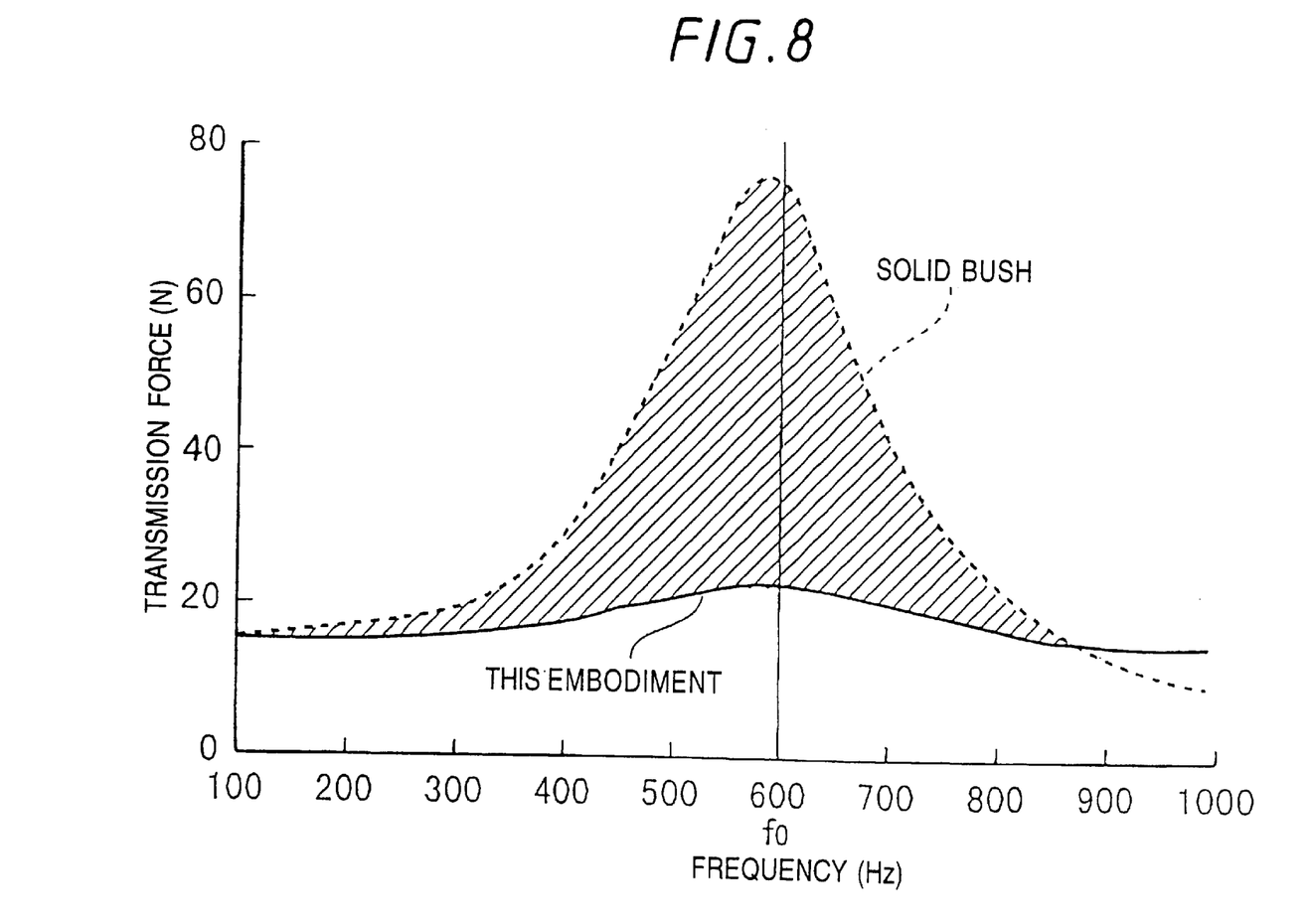
FIG. 8 is a graph showing a relation between an input frequency and a transmission force.

FIG. 1 to FIG. 8 shows an embodiment of the present invention. FIG. 1 is a perspective view of a rear suspension using a fluid-filled bushing. FIG. 2 is an expanded sectional view taken on line 2—2 in FIG. 1. FIG. 3 is a main part expanded view of FIG. 2. FIG. 4 is a graph showing the relation between an input frequency and a dynamic spring constant. FIG. 5 is a graph showing the relation between an input frequency and a resonance magnification. FIG. 6 is a graph showing a relation between an input frequency and a transmission force. FIG. 7 is a graph comparing the characteristics of a dynamic spring constant and a loss coefficient. FIG. 8 is a graph showing a relation between an input frequency and a transmission force.

FIG. 1 shows a suspension for a left rear wheel of a motor vehicle. A knuckle 1 supporting a wheel (not-shown) rotatably is connected with a vehicle body through a radial rod 2 extending forward, and also connected with the vehicle body through an upper arm 3, a front lower arm 4 and a rear lower arm 5 extending in the left/right direction. The vertical motion of the knuckle 1 is buffered by a shock absorber 7 having a coil spring 6 integrally. As shown in FIGS. 1 and 2, the upper arm 3, the front lower arm 4 and the rear lower arm 5 are arranged so that their base ends are pivotally supported on the vehicle body through fluid-filled bushinges 8 respectively, while their top ends are pivotally supported on the knuckle 1 through ball joints 9 respectively.

Next, the structure of the fluid-filled bushing 8 will be described on the basis of FIG. 3.

As shown in FIG. 3, a support shaft 10 of the fluid-filled bushing 8 is a hollow member having a bolt hole $10_1$ penetrated by a bolt 11 (see FIG. 1) for fixing the support shaft 10 on the vehicle body. A spherical portion $10_2$ is formed integrally at the axial center of the bolt hole $10_1$. The spherical portion $10_2$ of the support shaft 10 is rotatably supported on a bearing 13 made from synthetic resin and fixed on the inner circumferential surface of an inner cylinder 12. One end of the bearing 13 in the axial direction is put against a flange $12_1$ formed in the inner circumferential surface of the inner cylinder 12, while the other end in the axial direction is put against a stepped portion $12_2$ formed in the inner circumferential surface of the inner cylinder 12. Accordingly, the bearing 13 is prevented from release by a retainer 14.

An annular first rubber bushing 15 is fixed to the outer circumferential surface of the inner cylinder 12 by vulcanization baking bonding, while an annular outer collar 16 is fixed to the outer circumferential surface of the first rubber bushing 15 by vulcanization baking bonding. An inner collar 18 and an outer cylinder 19 are fixed to the inner circumferential surface and outer circumferential surface of an annular second rubber bushing 17 by vulcanization baking bonding respectively. The inner collar 18 is fitted to the outer circumference of the inner cylinder 12, and the outer collar 16 is fitted to the inner circumference of the outer cylinder 19. Consequently, an annular fluid chamber 20 filled with fluid is formed in a portion between the first rubber bushing 15 and the second bushing rubber 17. Boots 21 and 21 made from rubber are fitted between one end of the support shaft 10 and the inner cylinder 12 and between the other end of the support shaft 10 and the retainer 14 respectively, so that dust should not adhere to the contact surface between the spherical portion $10_2$ of the support shaft 10 and the bearing 13.

As shown in FIG. 1, the fluid-filled bushing 8 configured thus is fixed to the vehicle in such a manner that the support shaft 10 of the bushing 8 is fixed to the vehicle body by the bolt 11 penetrating the bolt hole $10_1$, while the outer cylinder 19 of the bushing 8 is pressed into and fixed to an annular support portion 22 formed at the base end of the upper arm 3 (or the front lower arm 4, or the rear lower arm 5). When the upper arm 3 rotates with the vertical motion of the knuckle 1, the bearing 13 supported on the upper arm 3 side and the spherical portion $10_2$ of the support shaft 10 supported on the vehicle body side are sliding on each other as they are in spherical contact with each other, so that the upper arm 3 is allowed to rotate smoothly.

When a load is applied to the upper arm 3 from the knuckle 1, the load is absorbed by the elastic transformation of the first and second rubber bushing 15 and 17 of the fluid-filled bushing 8. In addition, by the elastic transformation of the first and second rubber bushing 15 and 17 caused by the load, the inner cylinder 12 and the outer cylinder 19 are displaced relatively in the diameter direction. When the volumes on one side and the other side in the diameter direction of the annular fluid chamber 20 consequently increase and decrease alternately, fluid flows from the volume decreasing side toward the volume increasing side, so that a fluid columnar resonance phenomenon happens in the fluid chamber 20. As a result, the dynamic spring constant K* of the fluid-filled bushing 8 is lowered. Then, the fluid chamber 20 per se forms a fluid path.

FIG. 4 is a graph showing the characteristic of the dynamic spring constant K*, with respect to the input frequency, of the fluid-filled bushing 8 according to this embodiment. As is apparent from FIG. 4, the dynamic spring constant K* in the vertical direction (Z–Z' direction in FIG. 1) of the fluid-filled bushing 8 in this embodiment is set to take a minimum in the vicinity of the rigid resonance frequency $f_0$ (about 600 Hz) of the suspension arm (the upper arm 3, the front lower arm 4 or the rear lower arm 5). On the other hand, the dynamic spring constant K* of a conventional solid bushing has such a characteristic that it increases gradually in accordance with the increase of input frequency.

FIG. 5 shows the relation between the input frequency and the resonance magnification υ of the fluid-filled bushing 8 according to this embodiment. As is apparent from FIG. 5, the resonance magnification υ has such a characteristic that it takes a maximum value in the rigid resonance frequency $f_0$, and decreases before or after the rigid resonance frequency $f_0$.

FIG. 6 shows the result that a transmission force N was calculated from the characteristic of the dynamic spring constant K* shown in FIG. 4 and the characteristic of the resonance magnification υ shown in FIG. 5 on the basis of the relation: transmission force N=resonance magnification υ×dynamic spring constant K*. As is apparent from FIG. 6, in the range of the rigid resonance frequency $f_0$ of the suspension arm near 600 Hz, the transmission force N of the fluid-filled bushing 8 according to this embodiment is less than the transmission force N of the conventional solid bushing in the hatched portion, and the effect to improve road noise is confirmed in the vicinity of the rigid resonance frequency $f_0$.

FIG. 7 shows the characteristics of the dynamic spring constant K* and the loss coefficient tan δ with respect to the input frequency. The loss coefficient tan δ is a tangent of a loss angle δ between stress and strain, and a parameter as a measure of damping in a system forced to be vibrated. As is apparent from FIG. 7, a maximum value a of the loss coefficient tan δ is between a minimum value b and a maximum value c of the dynamic spring constant K*, and a frequency $f_1$ with which the dynamic spring constant K* takes the minimum value b is a little lower than a frequency $f_2$ with which the loss coefficient tan δ takes the maximum value a. That is, the frequency $f_1$ with which the dynamic spring constant K* takes the minimum value b is regarded as being substantially coincident with the frequency $f_2$ with which the loss coefficient tan δ takes the maximum value a. Therefore, when the dynamic constant K* takes the minimum value in the rigid resonance frequency $f_0$, the loss coefficient tan δ will take the maximum value substantially then. When the loss coefficient tan δ takes the maximum value, the resonance magnification υ is expressed by υ≈1/tan δ.

FIG. 8 corresponds to FIG. 6. FIG. 8 shows the transmission force N when the loss coefficient tan δ is set to take a maximum value in the rigid resonance frequency $f_0$, while FIG. 6 shows the transmission force N when the dynamic spring constant K* is set to take a minimum value in the rigid resonance frequency $f_0$. As is apparent from FIG. 8, in the range of the rigid resonance frequency $f_0$ of the suspension arm near 600 Hz, the transmission force N of the fluid-filled bushing 8 according to this embodiment is less than the transmission force N of the conventional solid bushing in the hatched portion, and the effect to improve road noise is confirmed in the vicinity of the rigid resonance frequency $f_0$.

To adjust the frequency at which the dynamic spring constant K* of the fluid-filled bushing 8 takes a minimum value, or the frequency at which the loss coefficient tan δ takes a maximum value to be coincident with the rigid resonance frequency $f_0$ of the suspension arm, there are some manners as follows:

(1) to increase the static spring constant of the fluid-filled bushing 8 (for example, to replace a material of the first and second bushing rubbers 15 and 17 with the other material having higher hardness);

(2) to increase the sectional area of a fluid path of the fluid chamber 20 functioning as a fluid path;

(3) to reduce the mass of fluid in the fluid chamber 20 functioning as a fluid path (for example, to shorten a fluid path or to reduce the specific gravity of the fluid); and (4) to reduce the movement (discharge amount) of fluid relative to the relative displacement between the inner cylinder 12 and the outer cylinder 19.

By suitably adopting and combining the above-mentioned manners shown in the paragraphs (1) to (4), it is possible to adjust the frequency at which the dynamic spring constant K* of the fluid-filled bushing 8 takes a minimum value, or the frequency at which the loss coefficient tan δ of the bushing 8 takes a maximum value to be coincident with the rigid resonance frequency $f_0$.

Although the embodiment of the present invention has been described in detail, various modifications in design can be made in the present invention within a scope not departing from its gist.

For example, the structure of the fluid-filled bushing 8 is not limited to what is shown in FIG. 3, the present invention is applicable to any other fluid-filled bushing having a desired structure.

As described above, according to the present invention, the frequency to keep the dynamic spring constant of the fluid-filled bushing to a minimum, or the frequency to keep the loss coefficient of the same to a maximum is set in the vicinity of the rigid resonance frequency of the suspension arm. Accordingly, a transmission force due to the vibration in the vicinity of the above-mentioned rigid resonance frequency transmitted from the road surface through the suspension arm is reduced, so that it is possible to improve road noise.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A fluid-filled bushing for supporting on a vehicle body an end portion of a suspension arm (3, 4, 5) which suspends a wheel of a motor vehicle, wherein a frequency to keep a dynamic spring constant of the fluid-filled bushing to a minimum is set in the vicinity of a rigid resonance frequency of the suspension arm.

2. A fluid-filled bushing for supporting on a vehicle body an end portion of a suspension arm (3, 4, 5) which suspends a wheel of a motor vehicle, wherein a frequency to keep a loss coefficient of the fluid-filled bushing to a maximum is set in the vicinity of a rigid resonance frequency of the suspension arm.

3. The fluid-filled bushing according to claim 1, in which said frequency (f) is within a range from $0.7 \times f_0$ to $1.5 \times f_0$, where $f_0$ designates said rigid resonance frequency of the suspension arm.

4. The fluid-filled bushing according to claim 2, in which said frequency (f) is within a range from $0.7 \times f_0$ to $1.5 \times f_0$, where $f_0$ designates said rigid resonance frequency of the suspension arm.

5. The fluid-filled bushing according to claim 3, in which said rigid resonance frequency $f_0$ of the suspension arm is in the vicinity of 600 HZ.

6. The fluid-filled bushing according to claim 4, in which said rigid resonance frequency $f_0$ of the suspension arm is in the vicinity of 600 HZ.

* * * * *